(No Model.) 4 Sheets—Sheet 1.

C. N. DUTTON.
MECHANISM FOR RECORDING VOLUMETRIC VALUES.

No. 441,094. Patented Nov. 18, 1890.

FIG. I.

(No Model.)

C. N. DUTTON.

4 Sheets—Sheet 2.

MECHANISM FOR RECORDING VOLUMETRIC VALUES.

No. 441,094.

Patented Nov. 18, 1890.

WITNESSES:

INVENTOR, (No Model.)  4 Sheets—Sheet 3.
C. N. DUTTON.
MECHANISM FOR RECORDING VOLUMETRIC VALUES.
No. 441,094. Patented Nov. 18, 1890.
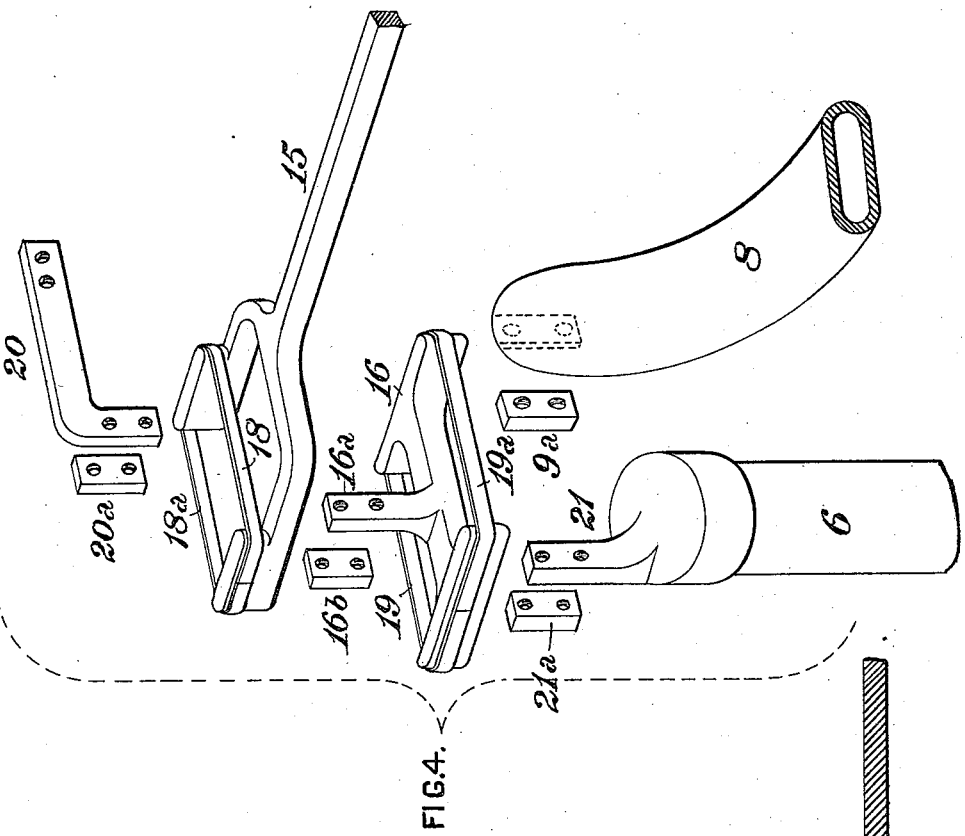
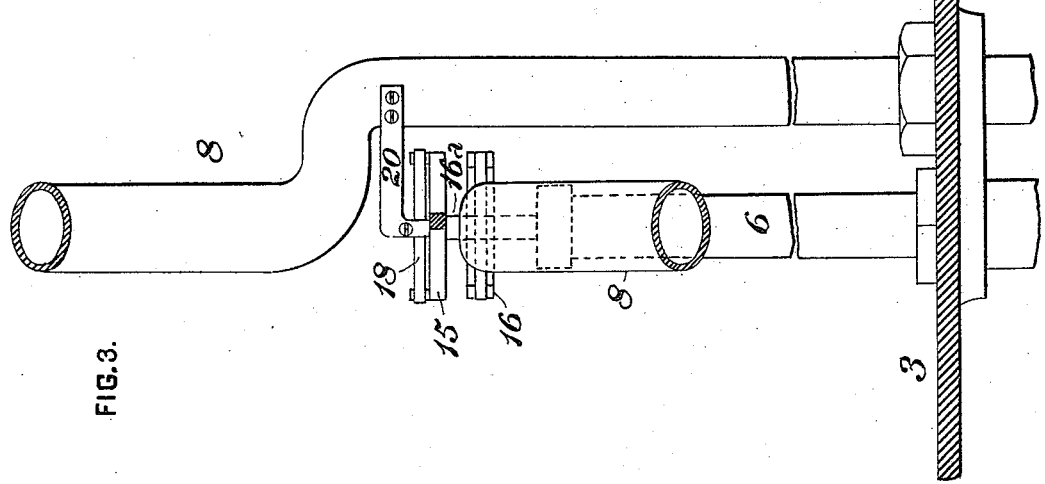
WITNESSES:
INVENTOR, (No Model.) 4 Sheets—Sheet 4.
C. N. DUTTON.
MECHANISM FOR RECORDING VOLUMETRIC VALUES.

No. 441,094. Patented Nov. 18, 1890.

UNITED STATES PATENT OFFICE.

CHAUNCEY N. DUTTON, OF PITTSBURG, PENNSYLVANIA, ASSIGNOR TO THE FUEL GAS AND MANUFACTURING COMPANY, OF SAME PLACE.

MECHANISM FOR RECORDING VOLUMETRIC VALUES.

SPECIFICATION forming part of Letters Patent No. 441,094, dated November 18, 1890.

Application filed August 14, 1889. Serial No. 320,708. (No model.)

*To all whom it may concern:*

Be it known that I, CHAUNCEY N. DUTTON, a citizen of the United States, residing at Pittsburg, in the county of Allegheny and State of Pennsylvania, have invented or discovered a certain new and useful Improvement in Mechanism for Recording Volumetric Values, of which improvement the following is a specification.

In meters which are designed for measuring liquids only, and in which only the volume or bulk of liquid which is practically unaffected by variations of pressure and temperature is sought to be determined, a simple dial-register is found to be sufficient for obtaining a registration of the quantity of liquid measured by the meter, and this is also the case in meters for illuminating-gas or other gas which is delivered at a pressure substantially uniform and but slightly above that of the atmosphere. It will, however, be readily seen that in the case of steam, natural gas under considerable ranges of pressure and temperature, or other expansive fluids under similar conditions the value of the volume of fluid measured and delivered will vary in accordance with variations of pressure or temperature, or both, and hence that in order to ascertain such varying value the recording mechanism must be adapted to present an indication which shall be varied automatically correspondingly with variations of temperature and of pressure and with the varying value of the fluid incident thereto.

The object of my invention is to provide an automatically-varied recording mechanism of such character as will enable the supplier or user of fluids, the values of which are varied by variations of temperature and of pressure, to readily and accurately determine both the volume and the value of such fluids; to which end my invention, generally stated, consists in the combination, with a meter, of a temperature-measuring mechanism, a pressure-measuring mechanism, and a recording device actuated jointly by the meter, the temperature-measuring mechanism, and the pressure-measuring mechanism.

The improvement claimed is hereinafter fully set forth.

Figure 1:
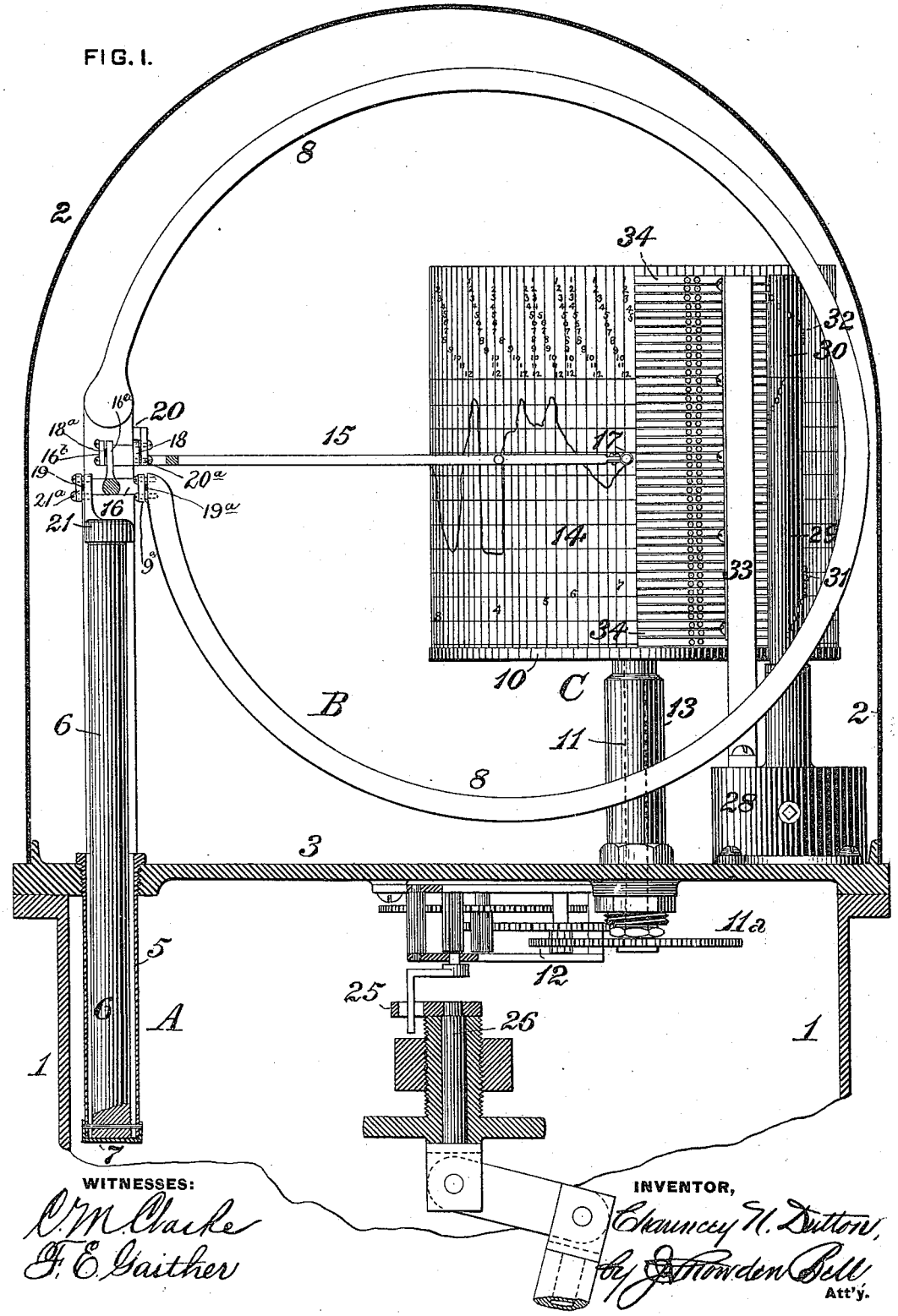
Figure 2:
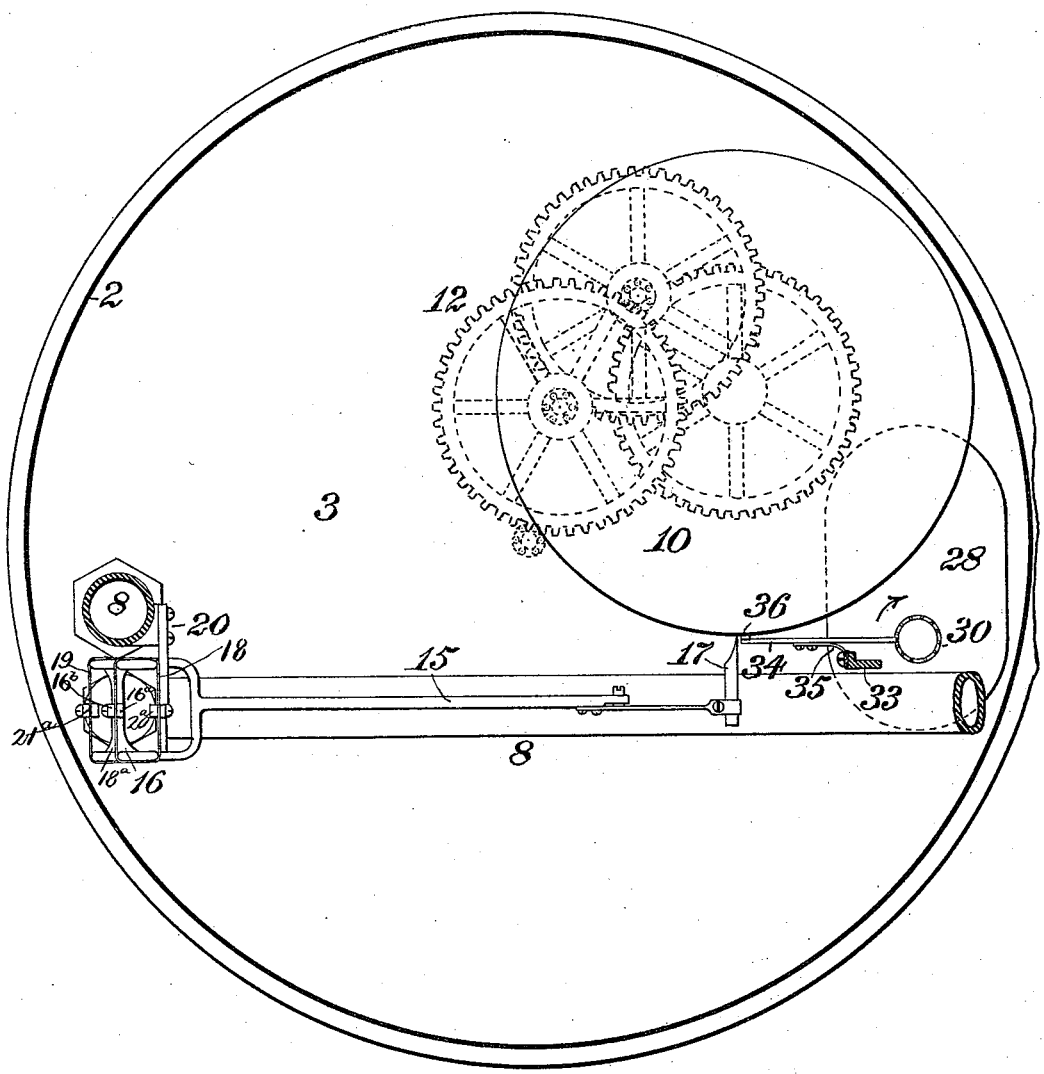
Figure 5:
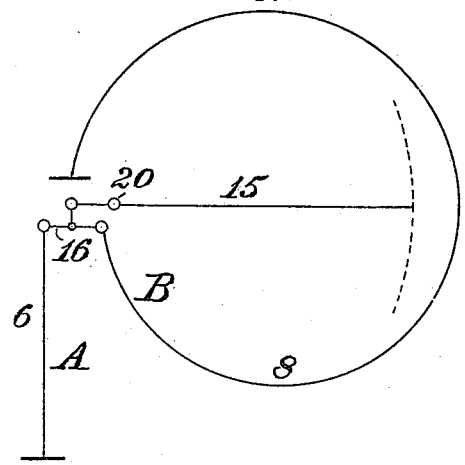

In the accompanying drawings, Figure 1 is a side view, partly in section, illustrating an application of my invention; Fig. 2, a plan or top view, partly in section, of the same; Fig. 3, an end view, partly in section; Fig. 4, a view in perspective and on enlarged scale, showing detached the several members through which the connection of the temperature-measuring mechanism, the pressure-measuring mechanism, and the recording device is effected; and Figs. 5 to 8, inclusive, are diagrammatic views illustrating the relation, under different modifications, of the essential features of an appliance embodying my invention.

In the practice of my invention I provide a suitable bed or assembling-plate 3, upon which the several members are supported, and which is adapted to be secured upon the case 1 of a fluid-meter in proper relation to the measuring mechanism thereof. A temperature-measuring mechanism or thermometric device A is connected to the assembling-plate 3 and projects therefrom for a sufficient distance into the meter to admit of its being properly subjected to the temperature of the fluid which is measured therein. The thermometric device preferably employed is, as shown in the drawings, composed of a highly-expansible sheet-metal outer casing 5 and an inner rod or stem 6, of material having a comparatively slight degree of expansibility—as, for example, wood or carbon—the casing 5 being connected at its upper end to the assembling-plate 3 and having its lower end closed by a tight cap 7, to which the rod 6 is secured. The function of the thermometric device is to effect the indications of variations of volumetric value due to variations of temperature.

A pressure-measuring mechanism B, which in this instance is a pressure-gage of the ordinary Bourdon type, being a bent tube 8, having a free end which is closed, and a fixed open end which communicates through an opening in the assembling-plate with the interior of the meter-casing, so as to be subject internally to the pressure of the fluid therein, is provided for the purpose of imparting to the recording mechanism, presently to be described, such movements as are requisite to indicate the variations of volumetric value due to variations of pressure. A diaphragm or piston subject to and adapted to be moved by the pressure of the fluid in the meter-casing, as in pressure-gages of such character, would constitute a mechanical equivalent of and may in the discretion of the constructor be substituted for the bent tube described and shown.

A graphic indication of the volume of fluid passed through the meter and the varying value thereof, as modified by variations of temperature and of pressure, is produced by a recording device C, which is mounted upon the assembling-plate 3, and is actuated jointly by the measuring mechanism of the meter and the thermometric device and pressure-measuring mechanism above described. The recording device consists of a drum 10 for carrying a sheet on which the record is marked, a stylus or marker 17, adapted to be moved transversely over the surface of a sheet placed upon the drum, and a train of gearing 12, by which the drum is rotated. The drum 10 is fixed upon a shaft 11, (indicated in dotted lines,) which passes through and has its bearing in a stuffing-box 13 on the plate 3, and carries upon its lower end within the meter-casing a gear 11ª, which through the train of gearing 12 is rotated by a crank 25, fixed upon a shaft 26, which is connected with and rotated by the measuring mechanism of the meter. Upon the surface of the drum 10 is secured a record-sheet 14, of tin-foil, paper, or other material adapted to receive and retain an impression, which sheet is divided circumferentially into uniform spaces, (shown by the vertical lines in Fig. 1,) each corresponding with a unit of volume, as, say, one thousand feet, and is divided transversely, as shown by the horizontal lines, into spaces, each corresponding with a percentage of the value of the fluid delivered, as determined by its pressure and temperature.

The graphic indication of volume and value of fluid is made upon the record-sheet 14 by a stylus or marker 17, fixed upon the free end of a recording-arm 15, which is connected at its opposite end to the thermometric device A and pressure-measuring mechanism B in such manner that vertical movements of the stylus, by which, in connection with the rotation of the drum 10, the record-line is drawn, are induced directly by and effected coincidently with the movements of the thermometric device and pressure-measuring mechanism due to variations of temperature and pressure. The recording-arm 15 is at its end farthest from the stylus 17 loosely connected or pivoted upon a suitable fulcrum having a fixed support 20, and is connected adjacent thereto to the thermometric device A and pressure-measuring mechanism B, in this instance through the intermediation of an auxiliary lever 16. In order to provide an extremely sensitive and at the same time positive action of the arm 15, I employ by preference torsional spring-fulcrums for the connection of the recording-arm with its support and with the auxiliary lever, and of the auxiliary lever with the thermometric device and pressure-measuring mechanism.

Referring more particularly to Figs. 3 and 4, the recording-lever 15 is forked at its pivot end and provided with two transverse torsional springs 18 18ª, one of which 18 is clamped centrally between the end of a support 20, secured to a suitable stand on the plate 3, being in this case the fixed vertical portion of the pressure-gage 8, and a block 20ª, connected by bolts to the support 20. The other spring 18ª of the arm 15 is clamped centrally between an upwardly-projecting arm 16ª on the auxiliary lever 16 and a block 16ᵇ. The auxiliary lever 16 is similarly provided with two transverse torsional springs 19 19ª, one of which 19 is clamped centrally between a projection on a cap 21, fixed upon the upper end of the rod 6 of the thermometic device A, and a block 21ª. The other spring 19ª is clamped centrally between the free end of the pressure-gage 8 and a block 9ª. It will thus be seen that the recording-arm 15 is loosely connected, equivalently to being fulcrumed to a fixed support, to the thermometric device and to the pressure-measuring mechanism.

Figure 6:
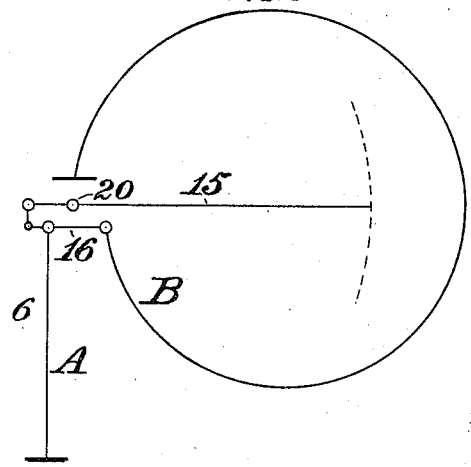
Figure 7:
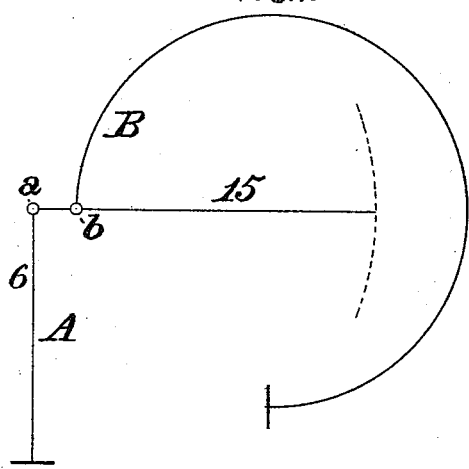
Figure 8:
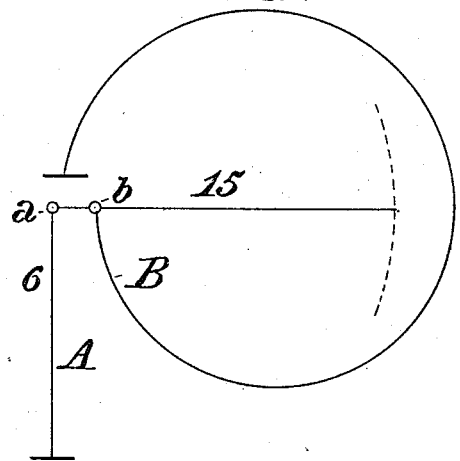

The recording-arm may be connected with the thermometric device and pressure-measuring mechanism either through an auxiliary lever, as in Figs. 1 to 6, inclusive, or directly, as in Figs. 7 and 8, and the action of said device and mechanism may be exerted upon the recording-arm either in the same or in opposite directions.

The construction illustrated in Figs. 1 to 5, and above described, in which the auxiliary lever 16 is connected at its ends to the thermometric device A and the pressure-measuring mechanism B, respectively, and intermediately connected to the recording-arm 15, which is in turn connected to a fixed support, is adapted when properly proportioned to present a correct record of the volumetric value of steam and other fluids of such character that increase, both of temperature and of pressure, effects an increase of value of the volume of delivered fluid. In operation as so arranged accession of pressure distends the pressure-gage 8, depressing its free end and the attached end of the auxiliary lever 16, which moves about its connection with the thermometric device A as a fulcrum, and consequently depresses the connected recording-arm 15, which moves about its own fulcrum on the support 20, its free end, which carries the stylus 17, being correspondingly elevated. Accession of temperature acting on the thermometric device effects a similar movement of the stylus, the extension of the casing 5 depressing the rod 6 and connected end of the auxiliary lever 16, moving the latter about its connection with the pressure-gage 8 as a fulcrum, and moving the recording-arm 15, as before. Decrease of temperature or of pressure will obviously effect movement of the stylus 17 in the opposite direction. A similar action results from the arrangement indicated in Fig. 7, in which the auxiliary lever 16 is dispensed with, and the recording-arm 15, instead of being connected to the fixed support 20, is connected directly to the thermometric device A and pressure-measuring mechanism B at the fulcrums $a$ and $b$, respectively. Accession of pressure moves the free end of the pressure-gage 8 and the attached portion and free end of the recording-arm 15 upwardly, the recording-arm moving about its fulcrum $a$ on the thermometric device. Increase of temperature depresses the rod 6 of said device and the attached portion of the arm 15, the free end of the latter being moved upwardly as the arm moves about its fulcrum $b$ on the pressure-gage 8. Opposite movement of the arm 15 results, as before, from decrease of temperature or of pressure. This system of connection is, however, less capable of variation than that first described, and hence while more simple is not as generally or desirably applicable.

In the arrangement indicated in Fig. 6, which is suitable for use in connection with a meter for measuring gas, the thermometric device and the pressure-measuring mechanism act to move the stylus-carrying end of the recording-arm 15 in opposite directions, respectively, instead of in the same direction, as in the previous cases. In this instance an auxiliary lever 16 is employed, said lever being connected at one end to the pressure-measuring mechanism B and at the other to the recording-arm 15, and being connected at an intermediate point to the thermometric device A. In this case accession of pressure causes the free end of the pressure-gage 8 and the connected end of the auxiliary lever 16 to move downwardly, the auxiliary lever moving about its connection with the thermostatic device as a fulcrum, the free end of the recording-arm 15 being thereby caused to also move downwardly through the connection of the auxiliary lever with said arm. Increase of temperature causes the auxiliary lever to move downwardly about its connection with the pressure-gage as a fulcrum, causing the connected end of the recording-arm 15 to move downwardly and its free end to move upwardly.

Fig. 8 exemplifies an arrangement in which a similar result is attained, the auxiliary lever 16 being dispensed with, and the recording-arm 15 being connected directly to the thermometric device and pressure-measuring mechanism in such manner that accessions of temperature and of pressure act to move the free end of the recording-arm in opposite directions respectively. Increase of temperature moves the end of the recording-arm 15, which is connected to the thermometric device downwardly, and consequently moves the free end of the arm upwardly, the arm moving upon its connection with the pressure-gage as a fulcrum. Accession of pressure moves the free end of the recording-arm downwardly, the arm moving upon its connection with the thermometric device as a fulcrum. The opposite movements of the free end of the recording-arm, produced under the two arrangements last above described, are proper when the amount or weight of fluid is the valuable commodity and is sought to be ascertained, as in the case of a gas of such character that a higher pressure is equivalent to a greater weight or value per volume and a higher temperature to a less weight or value per volume. Such movements would obviously be improper in the determination of the volumetric value of steam, in which the quantity of heat is the valuable commodity, as in such case increase of heat is the accompaniment of both increased temperature and increased pressure, and hence the action of the thermometric device and of the pressure-measuring mechanism must be in the same direction.

In many instances it becomes desirable to ascertain and record the periods during which steam or gas are used and the quantities used in given times. In order to present a record of such character, I provide an ordinary clockwork mechanism, which is inclosed in a case 28, fixed to the plate 3. This mechanism rotates two concentric cylinders 29 30, which project from the case 28. One of these cylinders, as 29, is adapted to rotate completely, say, once in a month, and is provided with a series of pins or projections 31 on its periphery, one for each day of the month. The other cylinder is geared to rotate once in, say, twelve hours and is provided with a corresponding number of pins or projections 32. A frame or standard 33 is fixed to the plate 3, adjacent to the drum 10, and arms 34, one for each unit of time, are attached to the standard 33 by springs 35. Each of the arms 34 has fixed upon one of its ends a suitable numeral-type 36, and its opposite end projects in position to be struck and moved by one of the pins 31 or 32 of the cylinder 29 or 30. The ends of the arms which carry the numeral-types normally stand slightly clear of the record-sheet 14 on the drum 10. When one of the pins 31 or 32 is brought in contact with the end of the adjacent arm 34, which contact is effected by the rotation of the cylinder in the direction of the arrow, Fig. 2, the adjacent end of the arm is forced in the direction of the drum 10 and the spring 35 is deflected. Upon the release of the arm by the pin in the rotation of the cylinder the elasticity of the spring forces the type end of the arm toward the drum, causing the type to strike and print upon the record-sheet the hour or day, as the case may be, after which the spring returns the arm to normal position.

In the operation of the apparatus, which is inclosed in a suitable protecting-case 2, a properly prepared and divided record-sheet 14 is secured upon the drum 10. The rotation of the crank 25 by the meter mechanism rotates the train of gearing 12 and drum 10 in such relation to the movement of the meter mechanism that one circumferential division on the drum and record-sheet will represent one unit of volume. The stylus 17, bearing on the face of the record-sheet, forms an irregular line thereon, which constitutes a record of the volume of fluid passed through the meter and of its volumetric value. The thermometric device A and pressure-measuring mechanism B determine and control the position of the stylus transversely to the drum and record-sheet, varying the same coincidently with and proportionately to variations of temperature and of pressure. The number of circumferential divisions traversed by the stylus indicates the volumes of fluid passed through the meter, and the transverse or inclined markings of the stylus the value of such units of volume relatively to a standard. The revolving cylinders 29 and 30 bring their pins 31 and 32 successively in contact with the arms 34, causing the types 36 thereof to print on the record-sheet, in the manner before described, numerals which indicate by their peripheral position the times in which the recorded units of volume were delivered. The record-sheet is preferably formed of foil rolled to uniform thickness, and by cutting the sheet apart on the track of the stylus the value of the fluid measured may be determined by weighing the foil.

While I have herein set forth an apparatus in which variations both of temperature and of pressure act upon a recording device in the formation of a record of volumetric values, such being adaptable and desirable in practice under the conditions most generally obtaining in the measurement and delivery of fluids, it will be obvious to those skilled in the art that in the case of saturated steam, and possibly in other instances, the variation of values due to variations of temperature and of pressure, respectively, have a known relation and are readily deducible one from the other. It therefore follows that in the application of my improvement in connection with the measurement of saturated steam the modification of the action of the recording device, which is due either to variation of temperature or variation of pressure, will suffice for the correct determination of the volumetric value of saturated steam which is passed through a meter. I do not, therefore, limit myself to a construction in which both a temperature-measuring mechanism and a pressure-measuring mechanism are coupled to and act upon a recording device, and include within the scope of my invention apparatus in which either a temperature-measuring device or a pressure-measuring device is connected with and acts singly upon a recording device.

I claim as my invention, and desire to secure by Letters Patent—

1. The combination, with a meter, of a temperature-measuring mechanism, a pressure-measuring mechanism, and a recording device connected with and actuated jointly by the meter, the temperature-measuring mechanism, and the pressure-measuring mechanism, substantially as set forth.

2. The combination, with a meter, of a device for graphically recording the measurements of the meter, suitable known mechanical connections for imparting movement thereto from and coincidently with the movements of the measuring mechanism of the meter, a thermometric device subject to and movable by variations of temperature in the meter, a pressure-measuring device subject to and movable by variations of pressure in the meter, and connections by which the thermometric device and pressure-measuring mechanism are coupled with and their respective movements transmitted to the recording device, substantially as set forth.

3. The combination, with a meter, of a temperature-measuring mechanism, a pressure-measuring mechanism, a volumetric recording device connected with and actuated jointly by the meter, the temperature-measuring mechanism, and the pressure-measuring mechanism, and a time-recording device adapted to operate in conjunction with the volumetric recording device, substantially as set forth.

4. The combination, with a meter, of an assembling-plate secured upon the meter-casing over an opening therein, a thermometric device fixed to said plate and projecting therefrom into the meter-casing, a pressure-measuring mechanism fixed to said plate and communicating with the interior of the meter-casing, a drum fixed upon a shaft passing through a stuffing-box and bearing in said plate, gearing connecting the drum-shaft with a shaft rotated by the measuring mechanism of the meter, a recording-arm coupled adjacent to one of its ends to a movable member of the thermometric device and of the pressure-measuring mechanism, and a stylus or marker fixed to said arm adjacent to the periphery of the drum, substantially as set forth.

5. The combination of an assembling-plate adapted to be secured to a meter-casing over an opening therein, a tube of highly-expansible material secured to and projecting from the meter side of said plate, a transmitting-rod of practically non-expansible material secured to a cap, closing the projecting end of said tube and extending through said plate, a curved tube secured at one end to said plate and communicating with an opening therein, the opposite and free end of said tube being closed, a drum fixed upon a shaft passing through a stuffing-box and bearing in said plate, a train of gearing mounted in bearings on the meter side of said plate and engaging a gear on the drum-shaft, a recording-arm coupled adjacent to one of its ends to the transmitting-rod and to the free end of the curved tube, and a stylus or marker connected to said arm adjacent to the periphery of the drum, substantially as set forth.

6. The combination of an assembling-plate adapted to be secured to a meter-casing over an opening therein, a thermometric device fixed to said plate and projecting therefrom on its meter side, a pressure-measuring mechanism fixed to said plate and communicating with an opening therein, a drum fixed upon a shaft passing through a stuffing-box and bearing in said plate, a train of gearing mounted in bearings on the meter side of said plate and engaging a gear on the drum-shaft, a recording-arm coupled to a fixed support, a stylus or marker connected to said arm adjacent to the periphery of the drum, and an auxiliary lever coupled to a movable member of the thermometric device and of the pressure-measuring mechanism and to the recording-arm, substantially as set forth.

7. The combination, with a meter, of an assembling-plate secured upon the meter-casing over an opening therein, a thermometric device fixed to said plate and projecting therefrom into the meter-casing, a device mounted upon said plate for graphically recording the measurements of the meter, and connections by which the thermometric device and the measuring mechanism of the meter are coupled with and their respective movements transmitted to the recording device, substantially as set forth.

8. The combination, with a meter, of an assembling-plate secured upon the meter-casing over an opening therein, a pressure-measuring device which is fixed to said plate and is subject to and movable by variations of pressure in the meter, a device mounted upon said plate for graphically recording the measurements of the meter, and connections by which the pressure-measuring device and the measuring mechanism of the meter are coupled with and their respective movements transmitted to the recording device, substantially as set forth.

9. The combination, with a meter, of an assembling-plate secured upon the meter-casing over an opening therein, a thermometric device fixed to said plate and projecting therefrom into the meter-casing, a drum fixed upon a shaft passing through a stuffing-box and bearing in said plate, gearing connecting the drum-shaft with a shaft rotated by the measuring mechanism of the meter, a recording-arm coupled adjacent to one of its ends to a movable member of the thermometric device, and a stylus or marker fixed to said arm adjacent to the periphery of the drum, substantially as set forth.

10. The combination, with a meter, of an assembling-plate secured upon the meter-casing over an opening therein, a pressure-measuring mechanism fixed to said plate and communicating with the interior of the meter-casing, a drum fixed upon a shaft passing through a stuffing-box and bearing in said plate, gearing connecting the drum-shaft with a shaft rotated by the measuring mechanism of the meter, a recording-arm coupled adjacent to one of its ends to a movable member of the pressure-measuring mechanism, and a stylus or marker fixed to said arm adjacent to the periphery of the drum, substantially as set forth.

In testimony whereof I have hereunto set my hand.

CHAUNCEY N. DUTTON.

Witnesses:
J. SNOWDEN BELL,
W. B. CORWIN.